US012727550B2

(12) United States Patent
Nandamuri

(10) Patent No.: US 12,727,550 B2
(45) Date of Patent: Sep. 8, 2026

(54) REPLACEABLE CHEMICAL STORAGE MODULE FOR TREE-INTERFACING DEVICES

(71) Applicant: E-ROOTREE LLC, Leander, TX (US)

(72) Inventor: Srilakshmi Bhavani Nandamuri, Leander, TX (US)

( * ) Notice: Subject to any disclaimer, the term of this patent is extended or adjusted under 35 U.S.C. 154(b) by 0 days.

(21) Appl. No.: 19/567,319

(22) Filed: Mar. 16, 2026

(65) Prior Publication Data

US 2026/0206690 A1 Jul. 23, 2026

(51) Int. Cl.
*A01G 7/06* (2006.01)

(52) U.S. Cl.
CPC .................................... *A01G 7/06* (2013.01)

(58) Field of Classification Search
CPC ........... A01G 7/06; A01G 29/00; B27K 3/105
See application file for complete search history.

(56) References Cited

U.S. PATENT DOCUMENTS 1,999,458 A * 4/1935 Hollister .................. A01G 7/06 206/0.5
2,970,404 A * 2/1961 Beaufils ................... A01G 7/06 81/418
3,074,207 A * 1/1963 Laing ....................... A01G 7/06 71/64.13
3,706,161 A * 12/1972 Jenson ..................... A01G 7/06 47/57.5
4,342,176 A * 8/1982 Wolfe ...................... A01G 7/06 47/57.5
4,651,468 A * 3/1987 Martinez .................. A01G 7/06 47/57.5
5,459,961 A * 10/1995 Merving .................. A01G 7/06 47/57.5
6,216,388 B1 * 4/2001 Miller ...................... A01G 7/06 424/405
6,311,429 B1 * 11/2001 Wolfe ...................... A01G 7/06 47/50
10,611,048 B1 * 4/2020 Helsing ................ B27K 3/0235
2018/0168107 A1 * 6/2018 Christensen ............. A01G 7/06

* cited by examiner

*Primary Examiner* — Joshua J Michener
*Assistant Examiner* — Nicole Paige Maccrate
(74) *Attorney, Agent, or Firm* — Novel Patent Services LLC

(57) ABSTRACT

A replaceable storage module for delivering chemical payloads into the vascular system of a living tree through a tree-interfacing device is disclosed. The module includes a housing with an internal reservoir for storing chemical formulations, at least one outlet port connected to the reservoir, a sealing interface for releasable coupling with the tree-interfacing device, and a flow-regulating interface that controls the release of chemicals into the tree's vascular system. The device is suitable for trees, woody plants, and agricultural crops, and is adaptable to differences in sap flow, plant tissue characteristics, and environmental conditions. Chemical payloads can be selected based on sap analysis, soil conditions, and species-specific nutrient requirements to enhance nutrient efficiency and minimize chemical waste. The modular design allows multiple replaceable storage modules to be integrated with the system, enabling scalable deployment, seasonal treatment cycles, and reduced manual intervention in plant health management.

18 Claims, 3 Drawing Sheets

REPLACEABLE CHEMICAL STORAGE MODULE FOR TREE-INTERFACING DEVICES

STATEMENT REGARDING FEDERALLY SPONSORED RESEARCH OR DEVELOPMENT

This invention was made with government support under NSF Award No. 2432240 awarded by the National Science Foundation (NSF). The government has certain rights in the invention.

FIELD OF INVENTION

The present disclosure relates to devices that interface with living trees to enable controlled exchange of materials with the sapwood vascular system. More specifically, the invention concerns tree-interfacing systems that utilize a replaceable solid-phase chemical storage module comprising one or more chemical payloads precisely quantified as per demands of tree and soil & sap analysis data including, but not limited to, fertilizers, nutrients, growth or metabolism promoters, biostimulants, and other plant-active supplements to support regulated delivery and holistic health management of trees for agricultural and horticultural applications.

BACKGROUND

Conventional agricultural and forestry practices typically deliver water, nutrients, and treatment agents to trees through soil-based or surface application techniques, such as broadcast fertilization, drip irrigation, or foliar spraying. While widely used, these approaches often exhibit limited efficiency due to evaporation, runoff, leaching, and uneven distribution, resulting in excessive resource consumption and potential environmental contamination.

To improve delivery efficiency and precision, direct tree treatment techniques have been developed that introduce fluids into tree tissues, including trunk injection systems and vascular infusion methods. Such systems are intended to bypass soil-mediated losses and deliver compounds more directly to internal tree transport pathways. However, many existing direct-delivery systems rely on rigid needles, permanent ports, or repeated drilling, which can damage vascular tissues and trigger tree wound responses.

Tree vascular systems, particularly xylem tissue, are highly sensitive to mechanical disruption, pressure imbalance, and gas intrusion. Improperly designed interfacing devices can induce embolism formation, vessel blockage, or localized tissue necrosis, thereby impairing sap transport and overall tree health. As a result, many existing injection-based systems are unsuitable for long-term or repeated use.

Further limitations arise from the use of externally pressurized fluid sources, mechanical pumps, or large storage tanks in conventional delivery systems. These components can impose fluid pressures that are incompatible with native xylem tension, leading to inefficient transport, backflow, or vascular stress. Additionally, such systems often require frequent monitoring, maintenance, and manual intervention, limiting scalability and practical deployment in large agricultural or forestry operations.

The physical and chemical properties of delivered fluids, including viscosity, density, pH, and temperature, also play a significant role in determining how effectively such fluids integrate with native sap flow. Fluids that are poorly matched to native sap characteristics may encounter hydrodynamic resistance, limited penetration, or uneven distribution within tree tissues. Existing delivery technologies generally lack mechanisms to account for or adapt to these parameters.

In addition to delivery challenges, long-term tree treatment systems must contend with the biological tendency of trees to isolate foreign objects or seal wounds over time. Without appropriate mechanical compliance or biological compatibility, interfaced devices may become encapsulated, occluded, or rendered ineffective, further restricting sustained operation.

The nutrient delivery is rendered substantially dependent of soil chemistry, such as soil pH, cation-exchange capacity, salinity, organic matter content, or other soil-dependent factors that limit nutrient uptake, including conditions in which soil analysis indicates surplus nutrient levels but plant intake remains restricted and environmentally toxic with external applications.

In addition, the handling of these chemicals of fertilizers and other supplements often needs complex equipment, labor, safety kits, large tanks and distribution systems without any custom dosages or supply as per actual demands of tree, even the soil and sap analysis data prescribes accurate dosage charts prompting over use of chemical in agriculture.

While direct tree-interfacing delivery systems improve localization of nutrient supply, many existing approaches continue to rely on dissolved fertilizers delivered as bulk fluids. Such approaches lack mechanisms for regulating nutrient release at the chemical or material level once introduced into vascular pathways. Rapid dissolution, burst release, or uncontrolled diffusion of nutrients can result in localized overdosing, inefficient utilization, or metabolic stress within tree tissues. Accordingly, there exists a need for storage modules capable of retaining nutrients in an engineered reservoir state and releasing such nutrients in a controlled and tunable manner in response to physiological conditions present within sapwood.

Therefore, there exists a need for a replaceable chemical payloads storage module configured for use with a tree-interfacing device to enable controlled exchange of materials with a living tree vascular system. A further need exists for systems that reduce dependence on external chemical supply infrastructure, minimize environmental impact, and support precise, regulated delivery, resourceful consumption withdrawal, or bidirectional exchange of fluids and plant-active chemical payloads with reduced manual intervention.

SUMMARY OF THE INVENTION

The following presents a simplified summary of one or more embodiments of the present disclosure to provide a basic understanding of such embodiments. This summary is not an extensive overview of all contemplated embodiments and is intended to neither identify key nor critical elements of all embodiments, nor delineate the scope of any or all embodiments.

The present disclosure, in one or more embodiments, relates to a replaceable storage module for sourcing, controlled delivery of plant-active chemical payloads to a living tree vascular system through a tree interfacing device. The replaceable storage module comprises a housing defining an internal reservoir, an outlet port, a sealing interface, and a flow-regulating interface.

In one embodiment, the internal reservoir is configured to store one or more chemical payloads selected from nutrients, water, fertilizers, chemical treatments, biological agents, and diagnostic formulations. In one embodiment, the outlet port is coupled to the internal reservoir and is configured to establish sealed fluid communication with an internal flow conduit of the tree interfacing device. In one embodiment, the sealing interface is disposed at or adjacent to the outlet port. The sealing interface is configured to substantially prevent leakage of the one or more chemical payloads and substantially prevent ingress of air or gas during connection and disconnection.

In one embodiment, the flow-regulating interface is configured to control delivery of the one or more chemical payloads from the internal reservoir to the tree interfacing device at a rate based on passive pressure, osmotic potential, native xylem pressure and osmotic conditions. In one embodiment herein, the replaceable storage module is configured to be removably coupled to and decoupled from the tree interfacing device while maintaining a fluid communication with the internal flow conduit of the tree interfacing device and inhibiting ingress of gas into the internal flow conduit.

In one embodiment herein, the housing may comprise a rigid shell, a semi-rigid cartridge, or a flexible bladder. In one embodiment herein, the internal reservoir comprises a solid-phase or semi-solid storage matrix that comprises polymeric microcapsules, porous framework particles, or a combination thereof, dispersed within a hydrogel carrier or an elastomeric carrier.

In one embodiment herein, the one or more chemical payloads stored within the internal reservoir may comprise a formulation based on soil analysis data, sap analysis data, and species-specific nutrient requirements. In one embodiment herein, the internal reservoir is configured to release the one or more chemical payloads into a fluid compatible with xylem transport conditions, wherein a release rate of the one or more chemical payloads from the internal reservoir is governed by one or more of pH, ionic strength, osmotic gradient, temperature, and diffusion-limited transport.

In one embodiment herein, the internal reservoir has a volumetric capacity selected to supply the one or more chemical payloads over an extended duration. In one embodiment herein, the sealing interface may comprise an elastomeric septum, self-sealing valve, check valve, and pierceable membrane.

In one embodiment herein, the flow-regulating interface comprises a porous restrictor, membrane-based flow limiter, capillary structure, or hydrogel-based resistance element. In one embodiment herein, the replaceable storage module is configured to operate without an external mechanical pump.

In one embodiment herein, the flow-regulating interface comprises a passive flow resistance element configured to maintain a substantially controlled delivery rate of the one or more chemical payloads over an operational period despite variations in ambient temperature, fluid viscosity, and downstream pressure occurring during operation. In one embodiment herein, the replaceable storage module further comprises a pressure-decoupling element configured to isolate the internal reservoir from pressure fluctuations originating from the tree interfacing device, wherein the pressure-decoupling element comprises a compliant or deformable member.

In one embodiment herein, the sealing interface and the outlet port are configured such that the replaceable storage module is replaceable while maintaining a fluid-filled state within the internal flow conduit of the tree interfacing device. In one embodiment herein, the replaceable storage module is configured for use with a tree interfacing device coupled to xylem tissue of a living tree. In one embodiment herein, the housing comprises a keyed or indexed geometry that enforces a predetermined orientation when coupled to the tree interfacing device.

In one embodiment herein, the internal reservoir comprises multiple compartments configured to sequentially or selectively deliver the one or more chemical payloads. In one embodiment herein, the replaceable storage module is configured to be sterilized, prefilled, and sealed prior to installation. In one embodiment herein, the sealing interface and the outlet port are configured such that replacement of the replaceable storage module maintains a continuous fluid column within the internal flow conduit and prevents gas entry into the internal flow conduit. In one embodiment herein, the flow-regulating interface is configured to regulate delivery of the one or more chemical payloads under negative hydrostatic pressure present in xylem tissue during transpiration.

While multiple embodiments are disclosed, still other embodiments of the present disclosure will become apparent to those skilled in the art from the following detailed description, which shows and describes illustrative embodiments of the invention. As will be realized, the various embodiments of the present disclosure are capable of modifications in various obvious aspects, all without departing from the spirit and scope of the present disclosure. Accordingly, the drawings and detailed description are to be regarded as illustrative in nature and not restrictive.

BRIEF DESCRIPTION OF THE DRAWINGS

The accompanying drawings, which are incorporated in and constitute a part of the specification, illustrate an embodiment of the invention, and, together with the description, explain the principles of the invention.

DETAILED DESCRIPTION

Figure 1A:
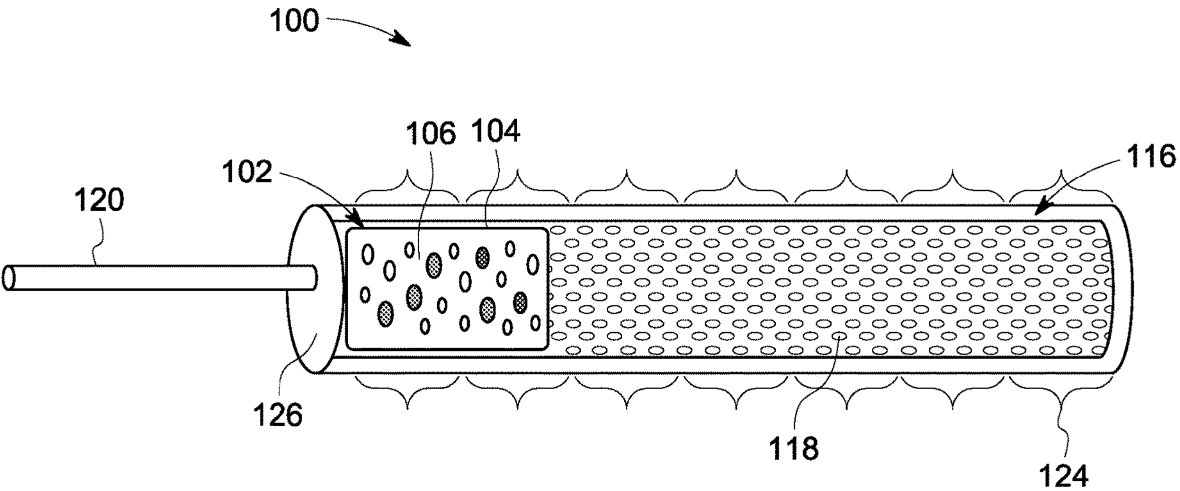
FIG. 1A illustrates a diagram of a tree interfacing device with a replaceable storage module for controlled exchange of chemical payloads with a living tree vascular system, in accordance with embodiments of the invention.

Reference will now be made in detail to the present preferred embodiments of the invention, examples of which are illustrated in the accompanying drawings. Wherever possible, the same reference numerals are used in the drawings and the description to refer to the same or like parts.

FIG. 1A refers to a diagram of a replaceable storage module 102 for controlled delivery of a chemical payloads to a tree interfacing device 100. In one embodiment herein, the replaceable storage module 102 is configured for use with the tree interfacing device 100 to enable controlled exchange of a chemical payloads selected from, but not limited to, nutrients, fertilizers, chemical treatments, biological agents, or diagnostic formulations, wherein the chemical payloads is provided in powdered, granular, or particulate solid forms with a living tree vascular system 100.

In one embodiment herein, the replaceable storage module 102 comprises a housing 104 defining an internal reservoir 106, at least one outlet port 108, a sealing interface 110, and a flow-regulating interface 112.

In another embodiment, although operation of the replaceable storage module 102 occurs in conjunction with native xylem pressure and osmotic gradients present in living trees, the claimed subject matter is directed to engineered structural components, including the housing 104, the internal reservoir 106, the outlet port 108, the sealing interface 110, and the flow-regulating interface 112. The replaceable storage module 102 employs man-made structural components configured to regulate delivery and exchange of the one or more chemical payloads under biological operating conditions.

In one embodiment, the tree interfacing device 100 is configured for controlled exchange of chemical payloads with vascular tree tissue, particularly sapwood xylem. The tree interfacing device 100 is adapted for insertion into a lateral bore formed in sapwood and is configured to regulate delivery and/or sampling of chemical payloads while minimizing embolism formation, tissue trauma, and tree defense signaling. In a representative implementation, the replaceable storage module 102 is coupled to the tree interfacing device positioned within sapwood, and delivery of chemical payloads is maintained over multiple days under native xylem tension without interruption of sap-compatible fluid communication. The sap-compatible fluid could be a fluid compatible with xylem transport conditions.

In one embodiment, the replaceable storage module 102 is loaded with chemical payloads with quantified and precise dosages by data of soil and sap analysis and species-specific nutrient requirements to promote nutrient use efficiency and reduce chemical waste in agriculture. The chemical payloads could be pre-filled based on soil and sap analysis and species-specific nutrient requirements.

In one embodiment, the internal reservoir 106 is configured to store one or more chemical payloads selected from, but not limited to, nutrients, fertilizers, chemical treatments, biological agents, and diagnostic formulations. In one embodiment, the chemical payloads are provided in a form, but not limited to, powdered, granular, and particulate solid forms. The housing 104 comprises a rigid shell, a semi-rigid cartridge, or a flexible bladder. The internal reservoir 106 has a volumetric capacity selected to supply the one or more chemical payloads over a period of at least 24 hours, at least 7 days, or an entire growing season. The housing 104 comprises a keyed or indexed geometry that enforces a predetermined orientation when coupled to the tree interfacing device 100. The internal reservoir 106 comprises multiple compartments configured to sequentially or selectively deliver different chemical payloads.

In one embodiment, the internal reservoir 106 of the replaceable storage module 102 is configured to store a chemical payloads in a non-dissolved state prior to delivery. The chemical payloads may comprise micro- and macronutrients including nitrogen, phosphorus, potassium, and micronutrients selected from boron, copper, iron, manganese, molybdenum, zinc, chlorine, or combinations thereof. The chemical payloads may further include metabolic promoters, growth regulators, or biostimulants.

In certain embodiments, the internal reservoir 106 may be implemented as an embedded functional layer integrated within the tree interfacing device 100 or as a discrete replaceable storage module 102 removably coupled thereto. Both configurations provide equivalent chemical payloads storage and controlled release functionality, differing primarily in serviceability and replacement interval, and may be selected based on installation requirements or operational duration.

In certain embodiments, the chemical payloads retained within the internal reservoir 106 is stored in the microencapsulation structures comprising polymeric, inorganic, or hybrid shell materials. Exemplary shell materials include biodegradable polyesters, polysaccharides, polyelectrolyte complexes, sol-gel derived silica, or combinations thereof. Representative polymeric materials include poly (lactic-co-glycolic acid), polycaprolactone, alginate, chitosan, polyethylene glycol derivatives, and multilayer polyelectrolyte assemblies.

The microencapsulation structures may have characteristic diameters ranging from approximately 1 μm to 500 μm, with shell thicknesses ranging from approximately 0.1 μm to 20 μm. The encapsulation structures may be configured to retain the chemical payloads under storage conditions and to release the payload upon exposure to sap-compatible fluids delivered through the flow-regulating interface 112.

In one embodiment, the internal reservoir 106 comprises a porous framework-based storage architecture configured to retain the chemical payloads through adsorption or coordination interactions. Such porous framework materials may include metal-organic frameworks, coordination polymers, or porous inorganic matrices. Representative framework compositions include zirconium-based, zinc-based, or iron-based frameworks configured to retain nutrient species within internal pore structures. The framework-based reservoirs are configured to release the chemical payloads upon exposure to sap-compatible fluids through hydration-induced diffusion, ligand exchange, or concentration-gradient-driven transport.

The framework-based reservoirs may be dispersed within a hydrogel, elastomer, or polymeric matrix to mechanically stabilize the chemical payloads while permitting controlled interaction with the delivered fluid.

In certain embodiments, the porous framework particles have characteristic particle sizes ranging from approximately 0.5 μm to 50 μm and may exhibit nutrient loading capacities ranging from approximately 10 weight percent to 90 weight percent relative to the framework mass. The framework-based reservoirs may be configured to release nutrients upon hydration, pH modulation, ionic exchange, or concentration gradient-driven diffusion when contacted by sap-compatible fluids.

In one embodiment, microencapsulation structures or porous framework particles are dispersed within the carrier matrix disposed inside the internal reservoir 106. The carrier matrix may comprise a hydrogel, elastomer, or polymeric network configured to retain the chemical payloads in a mechanically stable configuration while permitting controlled fluid infiltration. Representative hydrogel materials include polyethylene glycol diacrylate, polyvinyl alcohol, alginate, polyacrylamide, or combinations thereof. Representative elastomeric materials include thermoplastic polyurethanes, polycaprolactone-based elastomers, or compliant polymer blends.

In certain embodiments, the microencapsulation structure-based nutrient reservoirs disposed within the internal reservoir 106 exhibit nitrogen storage capacities ranging from approximately 0.01 grams of nitrogen per gram of microencapsulation material to approximately 0.28 grams of nitrogen per gram of microencapsulation material. Based on representative microencapsulation material densities ranging from approximately 0.8 grams per cubic centimeter to approximately 1.3 grams per cubic centimeter, such nitrogen storage capacities correspond to volumetric nitrogen storage densities ranging from approximately 0.008 milligrams of nitrogen per cubic millimeter to approximately 0.36 milligrams of nitrogen per cubic millimeter.

The carrier matrix may exhibit a water content ranging from approximately 40 percent to 95 percent by weight and may define an effective diffusion coefficient for nutrient species ranging from approximately $10^{-11}$ $m^2/s$ to $10^{-9}$ $m^2/s$, thereby contributing to diffusion-limited release behavior.

In certain embodiments, porous framework particles-based nutrient reservoirs disposed within the internal reservoir 106 exhibit nitrogen storage capacities ranging from approximately 0.01 grams of nitrogen per gram of framework material to approximately 0.41 grams of nitrogen per gram of framework material. Based on representative framework material densities ranging from approximately 0.2 grams per cubic centimeter to approximately 0.9 grams per cubic centimeter, such nitrogen storage capacities correspond to volumetric nitrogen storage densities ranging from approximately 0.002 milligrams of nitrogen per cubic millimeter to approximately 0.37 milligrams of nitrogen per cubic millimeter.

The foregoing nitrogen storage capacities are provided as exemplary performance characteristics of microencapsulation and framework-based reservoir architectures and do not limit the chemical payloads to nitrogen-containing species. Similar storage density relationships may be achieved for other nutrient species or combinations thereof depending on material selection, payload formulation, and reservoir architecture.

In one embodiment, release of the chemical payloads from the internal reservoir 106 is governed by one or more physiological or environmental trigger conditions. Such trigger conditions may include sapwood pH, ionic composition, osmotic potential, temperature, or combinations thereof. The release rate may further be regulated by diffusion resistance imparted by encapsulation shell thickness, matrix porosity, or selective-permeability coatings disposed within the internal reservoir.

In certain embodiments, the release behavior of the chemical payloads is coordinated with the flow-regulating interface 112 such that bulk fluid delivery rate and chemical payloads release kinetics operate in a coupled or decoupled manner to maintain a substantially constant nutrient flux into the tree vascular system. The coordination between the release behavior of the chemical payload and the flow-regulating interface 112 may be achieved through physical proximity or integrated construction. In one configuration, the internal reservoir 106 is disposed immediately adjacent to the flow-regulating interface 112 such that fluid entering the internal reservoir 106 through the flow-regulating interface 112 must traverse at least a portion of the internal reservoir 106 before reaching the outlet port 108, thereby ensuring that fluid interacts with the chemical payload prior to delivery to the tree interfacing device 100. In an alternative configuration, the flow-regulating interface 112 is disposed within the internal reservoir 106 such that fluid must pass through the flow-regulating interface 112 both upon entry into and exit from the internal reservoir 106.

In certain embodiments, release of the chemical payloads from the internal reservoir 106 is responsive to sapwood-compatible physiological conditions. Sapwood pH values typically range from approximately 5.0 to 6.5, and the microencapsulation structures or porous framework materials may be configured to alter permeability, degradation rate, or ligand binding behavior within this pH range. Ionic species present in sapwood, including potassium, calcium, magnesium, and sodium ions, may further influence release kinetics through ionic exchange or osmotic interactions.

Temperature-dependent release behavior may occur within a physiological temperature range of approximately 5° C. to 45° C. encountered during seasonal operation. The internal reservoir 106 may be configured such that chemical payloads release remains substantially stable across expected diurnal temperature variations.

In certain embodiments, the internal reservoir 106 further comprises a selective-permeability coating disposed around or adjacent to the chemical payloads'reservoir layer. The selective-permeability coating may exhibit preferential transport characteristics for cationic or anionic species, thereby regulating outward nutrient flux while inhibiting uncontrolled release. Such selective-permeability behavior may be achieved using ion-exchange materials, charged polymer membranes, or functionalized hydrogel interfaces compatible with sapwood chemistry.

In one embodiment, the internal reservoir 106 comprises a layered architecture including a structural matrix layer, a chemical payload reservoir layer, and an optional selective-permeability barrier. The structural matrix layer may comprise a hydrogel or elastomer configured to retain microencapsulated or framework-based payloads in a stable spatial arrangement. The chemical payloads reservoir layer may comprise microcapsules, porous framework particles, ion-exchange materials, or combinations thereof. The selective-permeability barrier is configured to regulate outward diffusion of the chemical payloads and inhibit burst release. In the layered architecture, the structural matrix layer, chemical payload reservoir layer, and the optional selective-permeability barrier may be arranged in a concentric, planar, or tubular configuration depending on the geometry of the housing 104.

The layered architecture may be disposed entirely within the housing 104 of the replaceable storage module 102 or may be positioned adjacent to the flow-regulating interface 112 to coordinate fluid entry and chemical payloads release.

In one embodiment, the outlet port 108 is coupled to the internal reservoir 106. The outlet port 108 is configured to establish sealed fluid communication with an internal flow conduit 114 of the tree interfacing device 100.

In one embodiment, the replaceable storage module 102 is configured to supply the chemical payloads to the tree vascular system at a controlled nutrient flux selected to meet species-specific and growth-stage-specific requirements. In exemplary implementations, nutrient delivery rates may range from approximately 0.01 milligrams per day to 10 milligrams per day per nutrient species, depending on tree size, species, and physiological condition.

In certain embodiments, the replaceable storage module 102 supplies a portion of an annual nutrient demand of a tree, while the remainder of nutrient uptake is satisfied through native soil availability. The chemical payloads stored within the internal reservoir 106 may therefore be configured to supplement nutrient deficits rather than replace soil-based nutrient uptake entirely.

In one embodiment, the internal reservoir 106 is dimensioned to retain a quantity of chemical payloads sufficient to support controlled nutrient release over a period of at least several days, several weeks, or an entire growing season. The reservoir volume, payload loading, and release kinetics may be selected such that replacement of the replaceable storage module 102 occurs at intervals aligned with seasonal agricultural management practices rather than frequent manual intervention.

The replaceable storage module 102 may be provided in pre-filled and sealed configurations with different reservoir capacities or chemical payloads formulations selected based on species, geographic region, or site-specific conditions obtained by soil and sap analysis, therefore reducing chemical wastage.

In certain embodiments, surfaces of the internal reservoir 106, the carrier matrix, or flow-regulating interface 112 are treated with coatings configured to inhibit gas nucleation, bubble formation, or microbial growth. Such coatings may include hydrophilic surface treatments, anti-fouling polymer layers, or antimicrobial additives compatible with plant tissue. These coatings further support maintenance of a continuous fluid column and reduce the risk of embolism formation during long-term operation.

In certain embodiments, the internal reservoir 106, the carrier matrix, or flow-regulating interface 112 incorporates antimicrobial agents or biofouling-resistant surface treatments configured to inhibit microbial colonization during long-term deployment within sapwood. Such measures reduce degradation of chemical payloads, prevent occlusion of membrane interfaces, and preserve consistent nutrient delivery performance over extended operational periods.

In one embodiment, the sealing interface 110 is disposed at or adjacent to the outlet port 108. The sealing interface 110 is configured to prevent leakage of the one or more chemical payloads and inhibit ingress of air or gas during connection, disconnection, and operation. The sealing interface 110 comprises an elastomeric septum, self-sealing valve, check valve, or pierceable membrane to prevent leakage.

In one embodiment, the sealing interface 110 and the outlet port 108 are configured such that replacement of the replaceable storage module 102 maintains a continuous fluid column within the internal flow conduit 114 and prevents gas entry capable of inducing embolism in xylem tissue.

In one embodiment, the flow-regulating interface 112 is operatively coupled to the outlet port 108. The flow-regulating interface 112 is configured to deliver the one or more chemical payloads from the internal reservoir 106 to the tree interfacing device 100 at a controlled rate under passive pressure, osmotic potential, or native biological pressure conditions. The flow-regulating interface 112 comprises a porous restrictor, membrane-based flow limiter, capillary structure, or hydrogel-based resistance element. In one embodiment herein, the one or more chemical payloads in solid particulate form retained within the internal reservoir 106 and released upon interaction with fluid entering through the flow-regulating interface 112.

In one embodiment, the replaceable storage module 102 is configured to be removably coupled to and decoupled from the tree interfacing device 100 without interrupting long-term operation of the tree interfacing device 100 or inducing gas entry into a connected biological system. The sealing interface 110 and the outlet port 108 maintain a fluid-filled connection to inhibit gas ingress. The replaceable storage module 102 is configured to operate without an external mechanical pump. The replaceable storage module 102 is configured to deliver the one or more chemical payloads at a substantially constant rate despite variations in ambient temperature, viscosity, or downstream pressure.

As used herein, a "substantially constant" delivery rate refers to a flow rate delivered through the flow-regulating interface 112 that varies by no more than approximately ±10-20% over an operational period when exposed to expected variations in ambient temperature, fluid viscosity, or downstream xylem pressure conditions. The flow-regulating interface 112 is configured to regulate fluid delivery under negative hydrostatic pressure characteristic of xylem tissue. The replaceable storage module 102 operates without external positive pressure and without inducing cavitation or embolism within the xylem tissue.

In one embodiment, the replaceable storage module 102 further comprises a pressure-decoupling element configured to isolate the internal reservoir 106 from pressure fluctuations originating from the tree interfacing device 100. The pressure-decoupling element may comprise a compliant or deformable member. The replaceable storage module 102 is configured to be replaced while maintaining a fluid-filled state within the internal flow conduit 114 of the tree interfacing device 100. The replaceable storage module 102 is configured for use with a tree interfacing device 100 coupled to xylem tissue of a living tree. The replaceable storage module 102 is configured to be sterilized, prefilled, and sealed prior to installation.

Figure 1B:
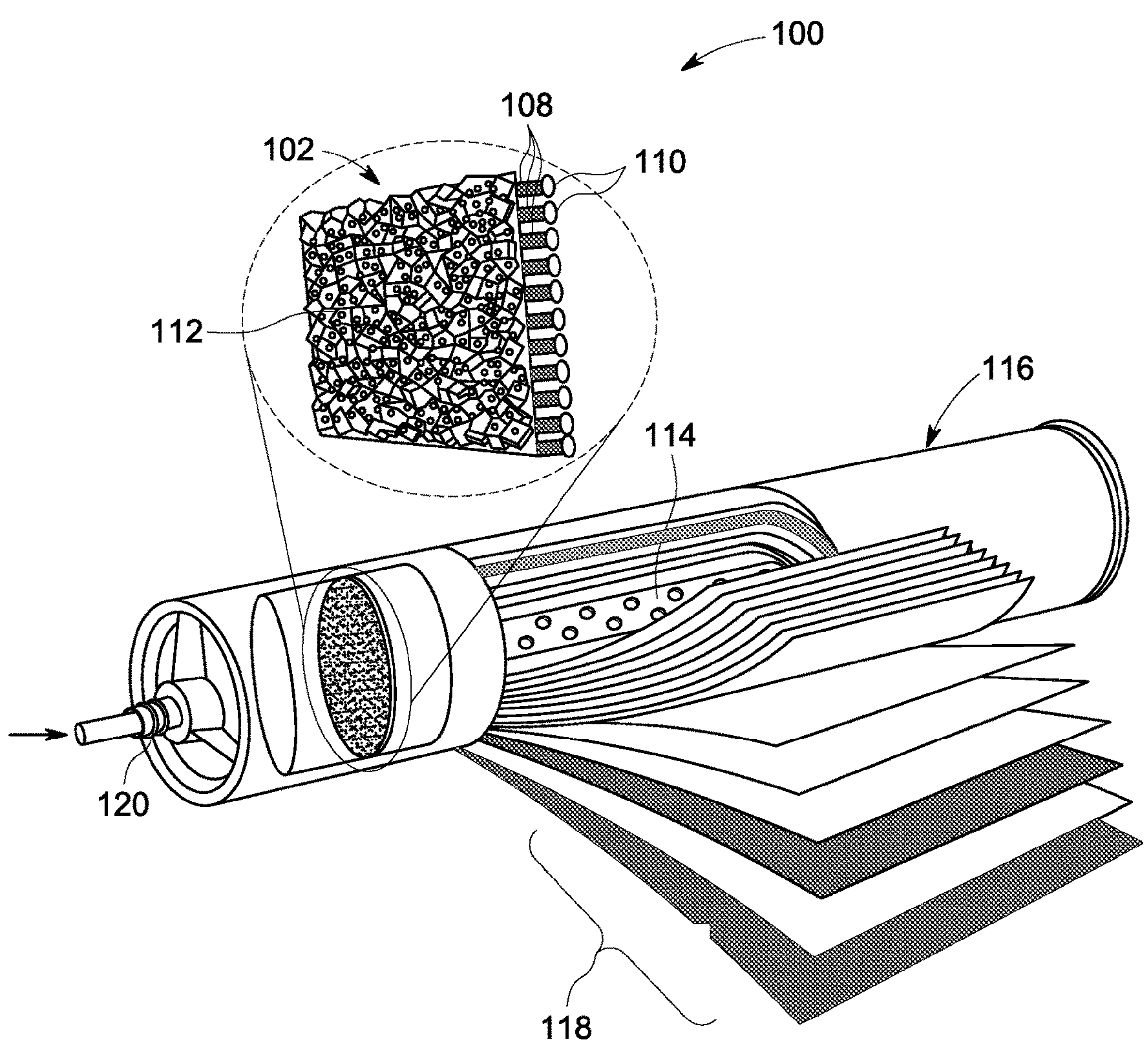
FIG. 1B illustrates a detailed view of the replaceable storage module, in accordance with embodiments of the invention.

FIG. 1B refers to a detailed view of the replaceable storage module 102. In one embodiment, the tree interfacing device 100 comprises a body 116, the internal flow conduit 114, a multi-layer membrane assembly 118 and one or more tissue-engaging surface structures 124.

In one embodiment, the internal flow conduit 114 is configured for bi-directional fluid exchange, enabling both extraction of sap and delivery of the one or more chemical payloads, for example, nutrients or treatment fluids. The internal flow conduit 114 is configured to define a hydraulic permeability sufficient to regulate bidirectional fluid exchange between the tree interfacing device 100 and xylem tissues at a rate of about 0.1-100 μL/s under native xylem tensions.

In certain embodiments, the replaceable storage module 102 is operatively coupled to the multi-layer membrane assembly 118 such that release of the chemical payloads from the internal reservoir 106 is selectively modulated based on sensed xylem conditions. Feedback signals representative of sap flow behavior, pressure, or chemical composition may be used to dynamically influence nutrient release timing or magnitude, thereby supporting adaptive and demand-responsive delivery of nutrients into tree vascular tissue.

In certain embodiments, release of the chemical payloads from the internal reservoir 106 is further influenced by electrokinetic conditions present within or generated by the tree interfacing device 100. The multi-layer membrane assembly 118 may establish localized electric fields, charge gradients, or ion flux conditions that alter migration, diffusion, or release behavior of charged nutrient species retained within the internal reservoir. Such electrokinetic modulation enables additional control over nutrient delivery timing and magnitude without reliance on external mechanical actuation.

In one embodiment, sensed parameters derived from xylem tissue, including sap flow rate, ionic composition, pressure, or chemical concentration, are used to modulate release behavior of the chemical payloads stored within the internal reservoir 106. The multi-layer membrane assembly 118 may dynamically adjust permeability, residence time, or exposure of sap-compatible fluids to the chemical payload, thereby establishing a closed-loop delivery architecture responsive to tree-specific physiological demand.

Figure 2:
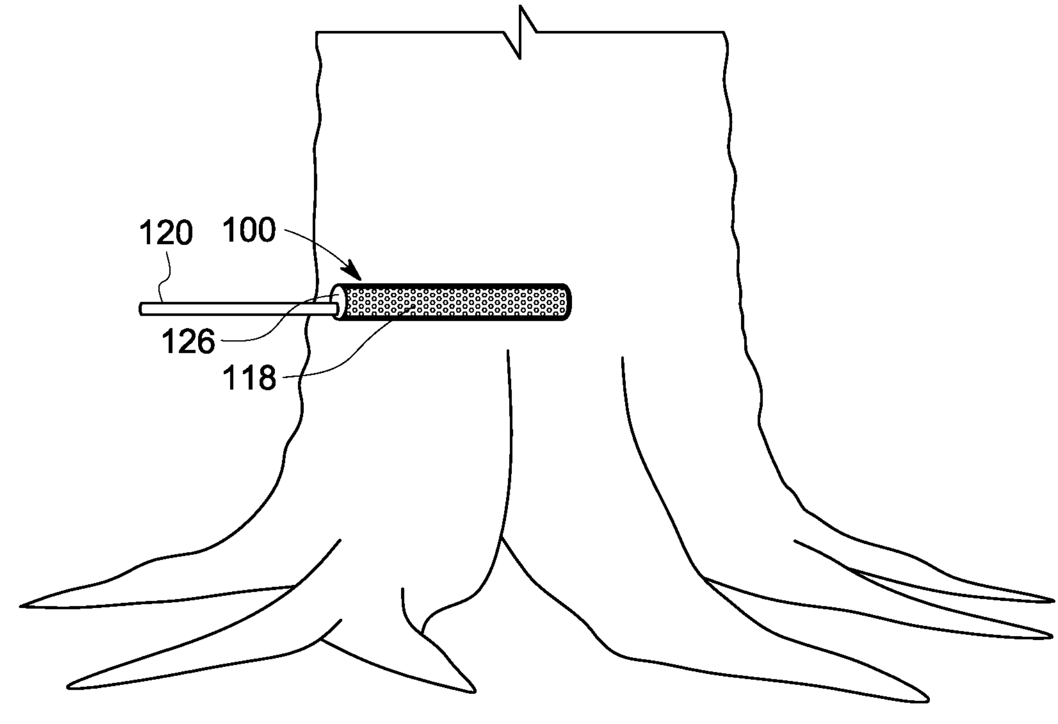
FIG. 2 refers to a detailed view of the replaceable storage module, in accordance with embodiments of the invention.

FIG. 2 refers to a schematic perspective view of the tree interfacing device 100 positioned within sapwood of a tree. The replaceable storage module 102 enables sustained and controlled fluid exchange directly with living tree vascular tissue, particularly xylem tissue, without inducing embolism, vascular blockage, or long-term wound isolation. Unlike conventional trunk injection or needle-based systems, the replaceable storage module 102 is configured to maintain compatibility with native xylem pressure conditions, thereby supporting long-term or repeated operation.

In one embodiment, an access opening is formed in a trunk of a tree by drilling a bore having a diameter in a range of approximately 2 inches to 5 inches, depending on tree species and trunk geometry. The access opening extends into sapwood so as to expose active xylem tissue and permit insertion of the tree interfacing device 100. The access opening is sized to allow stable placement of the tree interfacing device 100 while minimizing tissue disruption and preserving native xylem transport.

In one embodiment, the tissue-engaging surface structures 124 are an outer core anchoring and feedback module that is disposed at an outer region of the tree interfacing device 100 and is positioned in contact with the sapwood. The tissue-engaging surface structures 124 is configured to seat and mechanically stabilize the device 100 within the access opening while providing controlled gating of fluid exchange with xylem tissue. The tissue-engaging surface structures 124 further comprises one or more sensing and receptor elements (not shown) configured to detect local xylem parameters, including pressure, sap flow behavior, and chemical or ionic conditions, and to generate feedback signals representative of local vascular transport dynamics.

The tree interfacing device 100 provides the ability to dynamically regulate fluid transport characteristics, including permeability, flow resistance, and exchange rate, through multi-layer membrane assemblies responsive to local tree and fluid parameters. This adaptive behavior improves compatibility between delivered fluids and native sap flow, enhancing penetration and distribution within vascular pathways.

In one embodiment, the tree interfacing device 100 implanted in tree is configured to drive the fluid entering through a fluid inlet 120 to distribute across an entire tree canopy with a time period depending on fluid ion mobility rates and environmental factors.

The tree interfacing device 100 further comprises a sealing member 126 operatively coupled to the fluid inlet 120, wherein the sealing member 126 is configured to provide a fluid-tight interface between the fluid inlet 120 and bore hole. The sealing member 126 inhibits unintended leakage of fluid, pathogen entry and prevents ingress of air or gas into the perforated conduit 104 during operation.

In certain embodiments, the sealing member 126 comprises an elastomeric, compliant, or deformable material configured to accommodate pressure fluctuations arising from native xylem tension, fluid property modulation, or external handling. The sealing member 126 may further function as a pressure-isolating or decoupling element, enabling stable fluid delivery through the fluid inlet 120 without inducing embolism or disruption of native sap flow within the tree vascular system.

In some embodiments, the fluid inlet 120 is configured to permit bidirectional fluid flow, including extraction of sap from the tree vascular system and delivery of nutrients, treatment agents, or diagnostic fluids into the tree tissue. In such embodiments, the sealing member 126 is configured to maintain sealing integrity during both inflow and outflow conditions.

In certain embodiments, the tree interfacing device 100 enables fluid delivery under passive pressure conditions, osmotic gradients, or native xylem tension, thereby eliminating the need for external mechanical pumps or pressurized tanks. This reduces system complexity, energy requirements, and maintenance burden, while improving field deploy ability.

By interfacing directly with tree vascular tissue and regulating fluid exchange at the device-tissue interface, the tree interfacing device 100 improves the precision and efficiency of nutrient, water, or treatment agent delivery. This reduces losses associated with soil-based application methods, including runoff, leaching, and environmental contamination.

The tree interfacing device 100 supports modular integration of additional components, including optional replaceable storage modules, without altering the core tree interfacing functionality. This modularity enables scalability, seasonal operation, and reduced manual intervention, representing an advancement over fixed or infrastructure-heavy delivery systems.

The tree interfacing device 100 is adaptable for use with trees, woody trees, and agricultural crops, and can accommodate variations in sap flow, tissue properties, and environmental conditions. This flexibility extends the applicability of the invention beyond specialized or single-use tree treatment technologies.

Conventional fluid delivery systems adapted from medical, industrial, or soil-based agricultural technologies are fundamentally incompatible with living tree vascular systems. Unlike positive-pressure conduits used in medical infusion or irrigation systems, xylem tissue operates under sustained negative hydrostatic pressure and is highly susceptible to embolism formation upon gas ingress. Even momentary introduction of air into the internal flow conduit 114 during fluid exchange can permanently disrupt sap transport and impair tree viability.

A person of ordinary skill in the art would not have reasonably expected that replaceable fluid cartridges, check-valve systems, or externally pressurized reservoirs, commonly used in non-tree contexts could be successfully adapted for long-term fluid exchange with xylem tissue without inducing embolism, vascular occlusion, or wound isolation responses. Known trunk injection and needle-based systems rely on rigid insertion members, repeated drilling, or external pumping forces that impose pressures incompatible with native xylem tension.

In contrast, the replaceable storage module 102 is specifically configured to maintain a continuous fluid column between the internal reservoir 106 and the internal flow conduit 114, to inhibit gas entry during coupling and decoupling, and to passively regulate fluid delivery under native xylem pressure conditions without reliance on an external mechanical pump. These physiological constraints are unique to tree vascular environments and are not addressed, taught, or suggested by fluid delivery systems developed for non-tree applications.

Accordingly, the claimed invention is not a predictable variation or routine optimization of known fluid delivery technologies, but rather a tree-specific solution addressing biological and mechanical constraints that would discourage or teach away from direct adaptation of prior art systems.

Existing tree treatment systems typically introduce fluids through rigid needles, drilled ports, or externally pressurized conduits that disrupt vascular continuity and require repeated mechanical intervention. In contrast, the replaceable storage module 102 is configured to permit replacement while maintaining a fluid-filled state within the internal flow conduit 114, thereby preserving sealed fluid communication with xylem tissue and preventing gas ingress that would otherwise impair sap transport.

No known tree treatment system permits replacement of a fluid reservoir while maintaining sealed, continuous sap-compatible fluid communication with xylem tissue without inducing embolism or vascular blockage.

Prior art fluid delivery systems teach away from passive fluid exchange with tree vascular tissue by relying on positive pressure sources, rigid insertion members, or repeated access events that are incompatible with sustained xylem function. The replaceable storage module 102 addresses these limitations by enabling controlled delivery under native xylem tension while inhibiting embolism formation, a failure mode unique to tree vascular systems and absent from non-tree fluid delivery technologies.

The engineered internal reservoir architecture enables soil-independent nutrient delivery by retaining chemical payloads in a controlled-release form until interaction with sap-compatible fluids occurs. This reduces nutrient loss, mitigates environmental exposure, and enables precise supplementation of nutrient deficits without reliance on bulk soil fertilization. The combination of material-level release control and embolism-safe fluid delivery represents a technical advancement not achievable through conventional dissolved-nutrient injection systems.

In certain embodiments, the chemical payloads retained within the internal reservoir 106 of the replaceable storage module 102 is configured to provide physiologically synchronized nutrient delivery to the tree vascular system. Rather than functioning solely as a passive storage container, the replaceable storage module 102 may be configured as a phenology-responsive nutrient reservoir capable of releasing chemical payloads in response to physiological changes occurring within the tree vascular system during different stages of the growing cycle. Such stages may include dormancy break, bud development, flowering, fruit set, and seasonal vegetative growth. By aligning nutrient release behavior with these physiological phases, the replaceable storage module 102 enables targeted nutrient delivery at times when metabolic demand within the tree is elevated.

In certain embodiments, the chemical payloads stored within the internal reservoir 106 may be formulated using diagnostic information associated with a specific tree or orchard environment. Such information may include sap nutrient concentration measurements, soil nutrient availability data, species-specific nutrient demand curves, or seasonal phenological stage information. Based on such diagnostic inputs, the chemical payloads stored within the internal reservoir 106 may be configured as a customized formulation comprising selected macro-nutrients, micro-nutrients, biostimulants, or plant-active compounds in quantities tailored to the physiological requirements of the tree. This diagnostic-driven configuration enables precision nutrient management and reduces nutrient over-application associated with conventional soil or foliar delivery methods.

In certain embodiments, the internal reservoir 106 comprises a composite solid-phase storage architecture configured to retain chemical payloads in a controlled-release state prior to delivery to the tree vascular system. Such architectures may include microencapsulation structures, porous framework particles, ion-exchange materials, mineral microcrystals, or combinations thereof dispersed within a carrier matrix. Representative carrier materials may include hydrogels, elastomeric networks, polymer matrices, aerogels, or other fluid-permeable materials capable of stabilizing the payload while permitting controlled interaction with sap-compatible fluids.

In certain embodiments, the internal reservoir 106 may include microencapsulation structures comprising a nutrient-containing core and one or more surrounding shell layers formed from biodegradable polymers, polysaccharides, polyelectrolyte complexes, or hybrid polymer-inorganic materials. The encapsulation structures may exhibit characteristic diameters ranging from approximately 1 micrometer to 500 micrometers and may be engineered to provide diffusion-controlled release, pH-responsive permeability, moisture-induced swelling, temperature-dependent softening, or enzymatic degradation triggered by plant metabolites present within the sap stream.

In certain embodiments, the internal reservoir 106 further includes porous framework particles configured to retain nutrient species through adsorption, chelation, or ionic coordination interactions. Such framework particles may include metal-organic frameworks, coordination polymers, porous inorganic matrices, or hybrid framework structures. Representative framework materials may include zirconium-based, zinc-based, iron-based, or copper-based framework structures exhibiting high internal surface area and tunable pore structures capable of retaining nutrient species until release is triggered by hydration, pH variation, ionic exchange, or concentration gradients present within sapwood.

In certain embodiments, additional solid-phase carrier architectures may be incorporated within the internal reservoir 106 to store specific nutrient species. Such carriers may include ion-exchange resins, layered double hydroxide materials, zeolites, mineral microcrystals, doped glass matrices, or biochar structures. These materials may retain nutrient species through ion exchange, dissolution-controlled release, diffusion through hydrated polymer networks, or ligand exchange reactions occurring under sapwood chemical conditions.

In certain embodiments, different nutrient species may be stored within distinct carrier classes within the internal reservoir 106. For example, cationic nutrients including potassium, calcium, magnesium, manganese, zinc, copper, or nickel may be retained within cation-exchange materials or mineral carriers. Anionic nutrients including nitrate, sulfate, molybdate, or phosphate may be retained within anion-exchange materials or layered hydroxide structures. Neutral molecular nutrients including urea, boric acid, or silicic acid may be retained within polymer matrices, framework materials, or dissolution-controlled carriers. The use of multiple carrier classes within a single internal reservoir 106 enables storage of numerous nutrient species in a stable composite formulation without chemical incompatibility.

In certain embodiments, the internal reservoir 106 may comprise multiple compartments or spatially segregated payload regions configured to store different nutrient formulations or carrier materials. These compartments may enable sequential or selective release of nutrients over time or in response to physiological triggers encountered within the tree vascular system. Such a multi-compartment architecture enables staged nutrient delivery profiles that extend over multiple weeks or months of operation.

In certain embodiments, release of chemical payloads from the internal reservoir 106 is responsive to physiological parameters encountered within the sapwood environment. Such parameters may include sap temperature, moisture content, ionic composition, osmotic potential, and pH. For example, increases in sap temperature and sap flow rate occurring during early-season bud break may increase hydration of the carrier matrix and accelerate diffusion through microencapsulation shells or framework pores. Similarly, minor pH shifts within sapwood may influence ion-exchange behavior or ligand stability within the carrier materials, thereby modifying nutrient release kinetics.

In certain embodiments, the replaceable storage module 102 therefore operates as a physiologically synchronized nutrient reservoir that releases chemical payloads preferentially during periods of elevated metabolic activity within the tree. During dormancy or reduced metabolic activity, release rates may remain substantially lower, thereby conserving stored nutrients until physiological demand increases.

In certain embodiments, nutrient formulations stored within the internal reservoir 106 may be configured according to species-specific nutrient demand curves. For example, certain nut-bearing tree species may exhibit increased sulfur or zinc demand during early bud formation, while fruit-bearing species may require elevated boron or nitrogen concentrations during flowering phases. Similarly, potassium and calcium demand may increase during fruit development stages. By tailoring reservoir payload composition according to such demand curves, the replaceable storage module 102 enables species-optimized nutrient delivery profiles across an entire growing season.

In certain embodiments, the internal reservoir 106 comprises a hybrid composite formulation comprising both microencapsulation structures and porous framework particles dispersed within a hydrogel, elastomer, or polymer carrier matrix. Such hybrid composite structures enable high nutrient loading capacity, staged release behavior, compatibility with multiple nutrient species, and long-term stability under environmental field conditions. The hybrid architecture further reduces chemical antagonism between stored nutrients by isolating different nutrient species within discrete encapsulation structures or framework pores prior to release.

By storing nutrients in engineered solid-phase carrier systems within the internal reservoir 106 and releasing such nutrients only upon interaction with sap-compatible fluids, the replaceable storage module 102 significantly reduces nutrient losses associated with soil fertilization techniques, including runoff, volatilization, and leaching. The controlled-release architecture further enables long-term nutrient delivery with reduced labor requirements, allowing growers to implement seasonal nutrient management through periodic replacement of the replaceable storage module rather than frequent soil or foliar applications.

In the foregoing description various embodiments of the present disclosure have been presented for the purpose of illustration and description. They are not intended to be exhaustive or to limit the invention to the precise form disclosed. Obvious modifications or variations are possible in light of the above teachings. The various embodiments were chosen and described to provide the best illustration of the principles of the disclosure and their practical application, and to enable one of ordinary skill in the art to utilize the various embodiments with various modifications as are suited to the particular use contemplated. All such modifications and variations are within the scope of the present disclosure as determined by the appended claims when interpreted in accordance with the breadth they are fairly, legally, and equitably entitled.

It will readily be apparent that numerous modifications and alterations can be made to the processes described in the foregoing examples without departing from the principles underlying the invention, and all such modifications and alterations are intended to be embraced by this application.

The claimed invention is:

1. A replaceable storage module for controlled delivery of one or more chemical payloads to a living tree vascular system through a tree interfacing device, comprising:

a housing defining an internal reservoir configured to store the one or more chemical payloads selected from nutrients, water, fertilizers, chemical treatments, biological agents, and diagnostic formulations, wherein the one or more chemical payloads are provided in powdered, granular, and particulate solid forms;

an outlet port coupled to the internal reservoir, wherein the outlet port is configured to establish a sealed fluid communication with an internal flow conduit of the tree interfacing device;

a sealing interface disposed at or adjacent to the outlet port, wherein the sealing interface is configured to substantially prevent leakage of the one or more chemical payloads and substantially prevent ingress of air or gas during connection and disconnection; and a flow-regulating interface positioned in a fluid path between the internal reservoir and the outlet port, wherein the flow-regulating interface is configured to control delivery of the one or more chemical payloads from the internal reservoir to the tree interfacing device at a rate based on passive pressure, osmotic potential, native xylem pressure and osmotic conditions, wherein the replaceable storage module is configured to be removably coupled to and decoupled from the tree interfacing device while maintaining a fluid communication with the internal flow conduit of the tree interfacing device and inhibiting ingress of gas into the internal flow conduit.

2. The replaceable storage module of claim 1, wherein the housing comprises a rigid shell, a semi-rigid cartridge, or a flexible bladder.

3. The replaceable storage module of claim 1, wherein the internal reservoir comprises a solid-phase or semi-solid storage matrix that comprises polymeric microcapsules, porous framework particles, or a combination thereof, dispersed within a hydrogel carrier or an elastomeric carrier.

4. The replaceable storage module of claim 1, wherein the one or more chemical payloads stored within the internal reservoir comprise a formulation based on soil analysis data, sap analysis data, and species-specific nutrient requirements.

5. The replaceable storage module of claim 1, wherein the internal reservoir is configured to release the one or more chemical payloads into a fluid compatible with xylem transport conditions, wherein a release rate of the one or more chemical payloads from the internal reservoir is governed by one or more of pH, ionic strength, osmotic gradient, temperature, and diffusion-limited transport.

6. The replaceable storage module of claim 1, wherein the internal reservoir has a volumetric capacity selected to supply the one or more chemical payloads over an extended duration.

7. The replaceable storage module of claim 1, wherein the sealing interface comprises an elastomeric septum, self-sealing valve, check valve, and pierceable membrane.

8. The replaceable storage module of claim 1, wherein the flow-regulating interface comprises a porous restrictor, membrane-based flow limiter, capillary structure, or hydrogel-based resistance element.

9. The replaceable storage module of claim 1, wherein the replaceable storage module is configured to operate without an external mechanical pump.

10. The replaceable storage module of claim 1, wherein the flow-regulating interface comprises a passive flow resistance element configured to maintain a substantially controlled delivery rate of the one or more chemical payloads over an operational period despite variations in ambient temperature, fluid viscosity, and downstream pressure occurring during operation.

11. The replaceable storage module of claim 1, wherein the replaceable storage module further comprises a pressure-decoupling element configured to isolate the internal reservoir from pressure fluctuations originating from the tree interfacing device, wherein the pressure-decoupling element comprises a compliant or deformable member.

12. The replaceable storage module of claim 1, wherein the sealing interface and the outlet port are configured such that the replaceable storage module is replaceable while maintaining a fluid-filled state within the internal flow conduit of the tree interfacing device.

13. The replaceable storage module of claim 1, wherein the replaceable storage module is configured for use with a tree interfacing device coupled to xylem tissue of a living tree.

14. The replaceable storage module of claim 1, wherein the housing comprises a keyed or indexed geometry that enforces a predetermined orientation when coupled to the tree interfacing device.

15. The replaceable storage module of claim 1, wherein the internal reservoir comprises multiple compartments configured to sequentially or selectively deliver the one or more chemical payloads.

16. The replaceable storage module of claim 1, wherein the replaceable storage module is configured to be sterilized, prefilled, and sealed prior to installation.

17. The replaceable storage module of claim 1, wherein the sealing interface and the outlet port are configured such that replacement of the replaceable storage module maintains a continuous fluid column within the internal flow conduit and prevents gas entry into the internal flow conduit.

18. The replaceable storage module of claim 1, wherein the flow-regulating interface is configured to regulate delivery of the one or more chemical payloads under negative hydrostatic pressure present in xylem tissue during transpiration.

* * * * *